United States Patent Office 3,004,362
Patented Oct. 17, 1961

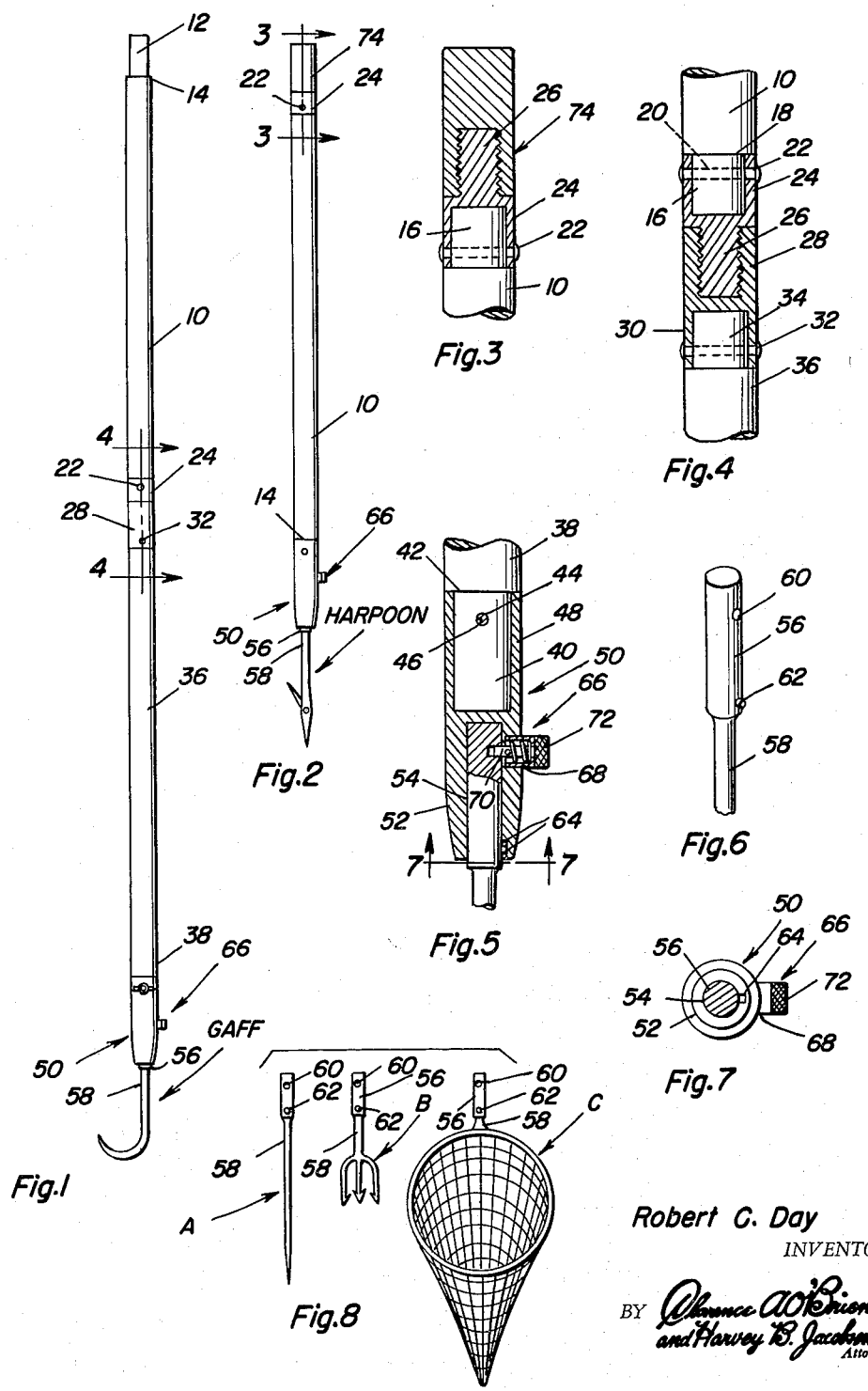

3,004,362
HANDLE WITH ADAPTER FOR FISHING
IMPLEMENTS
Robert C. Day, 1606 Main St., Baker, La.
Filed July 2, 1958, Ser. No. 746,198
1 Claim. (Cl. 43—6)

The present invention relates to certain new and useful improvements in a novel multipurpose implement handle, that is, a handle which is especially, but not necessarily, constructed to permit a number of selectively usable implements to be securely mounted for use on the outer or distal end of the handle.

In carrying out a preferred embodiment of the concept a sectional handle has been appropriated for use, the sections thereof having adjacent ends separably coupled together to in this manner, permit either one or both of the sections to be brought into use depending upon the requirements of the particular occasion for use. Stated otherwise, the handle is characterized by an inner or proximal section which is capable of being used by itself, and an outer or distal section which may be coupled to the inner section when a relatively long handle is needed.

Both sections of the handle have reduced end portions which are standardized in size and cross-section to accommodate a readily applicable and removable adapter. The adapter, in turn, is provided with a socket opening through its outer end, said socket having associated therewith a readily accessible and usable spring-biased retaining latch or pin, said pin projecting into the socket for releasable cooperation with a keeper socket such as is provided in the attaching and retaining shank of whatever tool or implement is to be telescopically fitted into the socket in a manner to securely join the tool or implement with the adapter.

Although the expression "implements" is being herein used to comprehend all sorts of tools and implements, as it were, the handle was primarily designed to constitude a primary part or component of a sportsman's rig. It follows that I am primarily concerned with the services which it satisfactorily performs in accommodating interchangeable selectively usable fishing implements such as, for example, a gaff, fishing gig, fishing net, harpoon and so on.

From the foregoing it will be evident that a general objective of the invention is to provide a sectional handle having a multipurpose adapter which permits the interchangeable implements to be applied and removed quickly and without the need of tools. For instance, let it be assumed that a fisherman checking a trot line has a net attached to the handle capable of landing an ordinary fish when, suddenly he finds that there is a big fish on the line requiring the use of a gaff. With this invention the net may be detached and replaced with a gaff quickly and easily and without necessitating the use of a wrench or any similar hand tool.

Novelty is also predicated upon a handle having an adapter which is constructed to prevent forward, rearward or twisting movements of the implement which is attached to the adapter. That is to say the adapter herein shown prevents rearward movement when a fish is gigged or harpooned, prevents forward motion when a big and heavy gaffed fish is lifted up and into the boat, and prevents twisting movement as for instance when using a net or an oyster rake.

Other objects, features and advantages will become more readily apparent from the following description and the accompanying illustrative, but not restrictive, drawing.

In the drawing, wherein like numerals are employed to designate like parts throughout the views:

FIG. 1 is an elevational view of the complete ready-to-use sectional handle showing a fishing gaff mounted and ready for use.

FIG. 2 is an elevational view showing a rearrangement of the components available in FIG. 1 and wherein the upper or proximal section of the handle has been detached from the lower or distal section and inverted, the adapter now being on the "lower" end and equipped with a harpoon.

FIG. 3 is a view on an enlarged scale with the parts appearing in section and elevation taken on the plane of the line 3—3 of FIG. 2, looking in the direction of the arrows and showing a screw cap in place.

FIG. 4 is an enlarged fragmentary view in section and elevation detailing the coupling means between the two sections, the section being on the line 4—4 of FIG. 1.

FIG. 5 is a view in section and elevation and suitably enlarged to show the particular construction of the adapter and latch means thereon.

FIG. 6 is a fragmentary perspective view showing the shank of one (any one) of the attachable and detachable implements.

FIG. 7 is a section on the line 7—7 of FIG. 5.

FIG. 8 is a group view showing several of the readily applicable and removable and selectively usable fishing implements capable of being used on and in conjunction with the handle. By way of introduction to the description of the details it will be understood that the specific "implements" are not new except that each "implement" whether it be a gaff, frog grab, fishing net or the like will have the same type of an attaching shank. That is to say the attaching shank of such implements will be standardized. Likewise the adapter therefor, which is to be more particularly described, is such in construction as to accommodate the standardized shanks of the varying implements which are capable of being used on the handle. The principal stress however will be placed on the improved handle and the adapter regardless of the "implement" which one desires to use thereon.

As before mentioned the novel handle is of two-part or sectional construction. The upper or proximal section which may be some five feet in length and constructed of wood or aluminum tubing is denoted by the numeral 10. The upper end 12 thereof is reduced in cross-section to provide a shoulder 14 and also the lower end (FIG. 4) is reduced in cross-section as at 16 to provide another shoulder 18. This end portion 16 has a hole passing therethrough as at 20 to accommodate a fastening 22 which holds in place the cup portion 24 of a reduced screw-threaded member 26 constituing the male component of the coupling means. This component screws into a screw-threaded socket in the female component 28 having a similar cup-like member 30 fastened at 32 to the reduced upper end 34 of the lower or distal section 36 of the handle. Here again this section 36 will be aproximately five feet more or less in length and of rigid lightweight wood, aluminum or the like. The lower end portion 38 (FIG. 5) of the distal section 36 has a further reduced terminal portion 40 defining a shoulder 42 and having a pinhole 44 therethrough to accommodate an insertable and removable pin, bolt or the like 46 which serves to removably mount the sleeve portion 48 of the detachable adapter 50 in place. The end portion 52 of the adapter has an axial socket 54 provided therein. This socket is such as to accommodate the insertable and removable head 56 on the shank 58 of an insertable implement. The head is here provided with a lateral keeper socket 60. It is also provided with a keying stud 62 which fits into a keeper notch or slot 64 (FIG. 5) provided at the outer end portion of the socket 54. This head portion of the implement is releasably but securely maintained in place by way of the novel latch means 66. This means comprises a casing 68 secured in a recess provided therefor in one side of the adapter. There is a spring loaded latch pin 70 mounted in the casing and having its inner end projectable into the keeper seat 60. The latch pin is provided on its outer end with a fixedly secured suitably knurled finger grip 72 which facilitates outward releasing movement of the latch pin.

As before stated the "implements" used in connection with this novel adapter-equipped sectional handle may be many and varied. However when starting out with this invention it was my idea to provide the purchaser with a novel sportsman's rig to fulfill the services involved in the handling of interchangeable implements. It might be mentioned that a list of such implements would include the gaff, harpoon throwing rig, frog grab, fishing net, fishing gig, flounder point, oyster rake and so on and so forth.

It will be evident too that the adapter is of the essence in this invention. It is preferably a conical shaped piece of metal made of hard aluminum, iron or brass. It is characterized by the knurled head or plunger, casing, copper coated stainless steel spring and spring retainer pin. In using the invention one would be told to insert an implement, grasp the knurled head and pull up against the pressure of the spring. This action lifts the plunger out of the keeper hole in the implement head. The knurled headed plunger is then released when a new head is put in position and keyed in place by the keying pin or stud 62 fitting into the keying groove 64 all as is evident, it is believed, by comparing and considering FIGS. 5 and 6.

The numeral 74 designates a screw cap which is attachable to the screw-threaded coupling member 26 in the manner seen in FIG. 3. In this connection it may be pointed out that the over-all shaft or handle is divided into two five foot sections as stated. The section 10 may be used in conjunction with a harpoon. This section does not have a hole through the medium of which the adapter is positively connectible thereto because in harpooning the shaft must float free leaving only the harpoon intact in the fish. This section 10 as shown in FIG. 2 is balanced for throwing by screwing the cap 74 on the coupling shank 26 in the manner seen in FIG. 3. When using the device as seen in FIG. 2 the adapter 50 is removed by withdrawing the pin 46. It is then slipped over the reduced end portion 12 but not fastened as already explained.

In FIG. 8 the reference letter A designates a flounder point constituting one of the implements, B designates a fishing gig and C, of course, designates a net. The shank of each implement is as shown in FIG. 6.

The invention is simple of construction, sturdy, economical to manufacture and has only one moving part; namely, the plunger-type latch.

There is little likelihood of accidentally releasing an implement during use. The knurled head of the plunger is spring biased against and abuts the casing, prohibiting any object (fishing line, edge of boat side etc.) accidentally pulling out plunger to release the implement. The movement of the plunger itself is a safety factor since it must be pulled up to release the implement instead of being pushed down, a movement that could be accidentally duplicated by contact with the side of a boat, debris in the water or the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A harpooning implement comprising an elongated shaft having a rearward end with a portion reduced in cross-section and defining an endless shoulder and an axially projecting first terminal shank, a ferrule fitted over said shank abutting the shoulder, secured to said shank and having an axial screw-threaded coupling element of reduced cross-section, a protective cap having an axial screw-threaded socket, said coupling element being screwed into said axial socket, said cap being of predetermined weight and having the additional function of a shaft balancing and throwing element, the forward end of said shaft being reduced in cross-section and providing a second reduced terminal shank and an abutment shoulder, said terminal shank being cylindrical in cross-section and smooth-surfaced, an attachable and detachable adapter having a sleeve portion fitted over said second shank and abutting the shoulder, said sleeve portion being readily applicable and removable and turnable on said second shank, the forward end portion of the adapter having an axial socket therein of a prescribed cross-section and depth, a harpoon shank having an attaching head corresponding in dimension with the dimension of said adapter socket and telescoping into said adapter socket, the wall of said adapter socket on one side being provided with latch means including a casing, said casing being secured in a recess provided therefor in said wall and being provided with a spring-loaded latch pin projecting into the adapter socket, the open mouth portion of the wall of said adapter socket being provided with a keying groove and said groove being in alignment with said latch, said head being provided on one side in a predetermined place with a lateral keeper socket and said latch fitting into said keeper socket, said head being provided on the same side and spaced from the keeper socket with a projecting keying stud fitting removably into a keeper slot provided therefor at the entrance of said adapter socket.

References Cited in the file of this patent

UNITED STATES PATENTS

| | | |
|---|---|---|
| 109,156 | Taylor | Nov. 8, 1870 |
| 196,354 | Harris | Oct. 23, 1877 |
| 273,279 | Hosea | Mar. 6, 1883 |
| 576,756 | Cole | Feb. 9, 1897 |
| 1,058,119 | Warner | Apr. 8, 1913 |
| 2,817,867 | Bugbird | Dec. 31, 1957 |

FOREIGN PATENTS

| | | |
|---|---|---|
| 125,056 | Australia | July 28, 1947 |
| 411,731 | Italy | June 9, 1945 |